United States Patent [19]
Yanagisawa et al.

[11] Patent Number: 5,151,310
[45] Date of Patent: Sep. 29, 1992

[54] INFORMATION RECORDING MEDIUM

[75] Inventors: Shuichi Yanagisawa; Tatsuro Sakai; Yasushi Murata; Fumio Matsui, all of Saitama; Yasuo Mitoh, Ibaraki, all of Japan

[73] Assignees: Pioneer Electronic Corporation, Tokyo; Nitto Denko Corporation, Osaka, both of Japan

[21] Appl. No.: 629,752

[22] Filed: Dec. 18, 1990

[30] Foreign Application Priority Data

May 28, 1990 [JP] Japan .................. 2-137445

[51] Int. Cl.$^5$ .................. B32B 3/00
[52] U.S. Cl. .................. 428/64; 428/65; 428/446; 428/447; 428/323; 428/328; 428/913; 346/76 L; 346/135.1; 369/288
[58] Field of Search .................. 428/64, 65, 446, 447, 428/323, 328, 913; 346/76 L, 135.1; 369/288

[56] References Cited
U.S. PATENT DOCUMENTS 4,414,273  11/1983  Wada et al. .................. 428/913
4,876,557  10/1989  Yabe .................. 346/135.1

FOREIGN PATENT DOCUMENTS 63-171443  7/1988  Japan .................. 428/64

Primary Examiner—Bruce H. Hess
Assistant Examiner—Elizabeth Evans
Attorney, Agent, or Firm—Sughrue, Mion, Zinn, Macpeak & Seas

[57] ABSTRACT

An information recording medium comprising a pair of disk substrates at least one of which has an optical recording layer on one surface thereof, wherein the substrates are bonded to each other by using a silicone type adhesive, directly or by the medium of a spacer, so that the recording layer may be disposed inside of the substrates. Platinum is incorporated in the above-mentioned silicone type adhesive by using a platinum type crosslinking catalyst, without using the conventional benzoyl peroxide type crosslinking catalyst. Accordingly, there is provided the information recording medium excellent in mechanical strength, reliability and durability.

6 Claims, 5 Drawing Sheets

INFORMATION RECORDING MEDIUM

FIELD OF THE INVENTION AND RELATED ART

The present invention relates to an information (or data) recording medium, particularly to an information recording medium wherein information can be recorded or reproduced by the use of light.

A optical disk, used as an information recording medium capable of effecting optical recording, is required to have various disk structures depending on the behavior of a recording film constituting the recording medium. For example, in a case where a thin film of an organic material (hereinafter, referred to as "recording film") is used as a recording layer, constituting the information recording medium, it is conventional that so called "pits" are made in the recording film so as to attain optical recording. In the case of an optical disk having such a recording film, it generally has a so-called "air-sandwich" structure wherein a space is provided on one side of the recording film of the optical disk. Further, the members constituting the optical disk include a wide variety of species, and an important member thereof is an adhesive for sealing. Such an adhesive contains a wide variety of reactive species (or reactants) as described below. These reactive species substantially affect the materials constituting the recording film.

The optical disks has three functions, information is recorded thereon (or therein), a system signal is precisely output therefrom, and information is stored therein. In every case, the recording film plays an important role. Accordingly, the thin film characteristics are required to have sufficient resistances to various external disturbances such as temperature, humidity, gas and light. In the organic thin film, it is not necessary to consider rusting or oxidation thereof, unlike metal films. However, the organic thin film can react with various reactive species to cause molecular degradation. Further, when the organic thin film contacts the reactive species for a long time, a change with the elapse of time, i.e., a change or degradation in the molecular structure can occur. Such a change can cause the thin film to malfunction. More specifically it is possible that various reactive species can be produced form the members constituting the optical so as to degrade the molecules of the organic thin film.

Accordingly, that the scope of the sealing bond used for forming the above-mentioned air sandwich structure is considerably be limited.

With respect to the kinds or applicability of the bond, thermosetting type adhesives include a mixture type bond comprising isocyanate and polyol which is capable of providing sufficient adhesive strength and producing substantially no undesirable effects on the recording film. However, it takes a long time to cure or harden this type of bond, and therefore it is difficult to put it to practical use in view of productivity.

Further, when an ultraviolet ray-curing type bond is used, an unreacted monomer capable of remaining therein adversely affects the organic thin film. Even when the above-mentioned bond is cured in a nitrogen atmosphere so that the unreacted monomer may completely be subjected to curing, it is extremely difficult to completely consume the remaining monomer. Further, in such a case, the production process is complicated and expensive.

Thus, with respect to the sealing bond which is most suitable to the organic thin film, the scope thereof is considerably be limited and poses problems in the production process.

On the other hand, one of the simplest sealing methods in view of the production process is a method wherein predetermined members are welded to each other by using ultrasonic vibrations. This method, however, can pose some problems as a large amount of welding gas is produced, birefringence in the peripheral portion surrounding the welded portion is increased, and the impact resistance of the resultant product is insufficient. Accordingly, it is also extremely difficult to put such a method to practical use.

In order to solve the above-mentioned problems, it is conceivable that an adhesive is used for the sealing bond. In such a case, points or factors to be considered may be a desired adhesive strength, and whether various components contained in the adhesive affect the recording film or not. When some reactive species capable of affecting the organic thin film are considered as components constituting the adhesive, they may include: (1) polymer (main or predominant component of the adhesive), (2) degradation or decomposition products produced from the polymer, (3) unreacted monomer, (4) crosslinking agent, (5) polymerization initiator, etc. Among these, the components (3) to (5) generally have strong reactivity and attention should be paid to such components.

The adhesive includes a wide variety of kinds. For example, since a rubber type adhesive component generally contains a tackifier (or tackiness-imparting agent), a softening agent, an anti-aging agent, etc., in addition to the above-mentioned components (1) to (5), and such an adhesive is not suitable for the above-mentioned purpose.

An acrylic type adhesive can produce acrylic acid due to the hydrolysis thereof, or contains acrylic acid per se (Japanese Patent Publication No. 1471/1962), and therefore it decomposes an organic material constituting the recording film.

A silicone type adhesive known in the prior art includes, for example, one comprisig 40 to 60 wt. parts of a copolymer comprising $SiO_2$ unit and $R_3SiO_{0.5}$ (molar ratio = 1:(0.5 to 1), and 40 to 60 wt. parts of dimethylpolysiloxane raw rubber (or crude rubber); or one comprising dimethylpolysiloxane raw rubber partially containing phenyl groups (Japanese Patent Publication No. 5186/1955 and 5099/1957). As the crosslinking catalyst for the above-mentioned silicone type adhesive, benzoyl peroxide, 2, 4-dichlorobenzoyl peroxide, dicumylbenzoyl peroxide, etc., are frequently used, and aminosilane is also known in the prior art.

However, when the above-mentioned catalyst is used, the catalyst contained in the resultant silicone adhesive affects the organic material constituting the recording film. For example, the benzoyl peroxide is decomposed into benzoic acid and can remain in the adhesive as an unreacted component. Since the benzoyl peroxide per se has strong reactivity, the unreacted component readily decomposes the above-mentioned organic material.

SUMMARY OF THE INVENTION

A principal object of the present invention is to solve the above-mentioned problems encountered in the prior art and to provide an information recording medium with excellent mechanical strength, reliability and durability by using an adhesive which does not affect a recording film of the information recording medium, and is excellent in mechanical characteristics, such as adhesive strength, temperature and humidity characteristics and viscoelastic characteristic.

According to the present invention, there is provided an information recording medium having a pair of substrates in the form of a disk at least one of which has an optical recording layer on one surface thereof. The substrates are bonded to each other, directly or by the medium of a spacer, by use of a silicone type adhesive so that the recording layer between the substrates.

The silicone type adhesive contains platinum therein.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

The preferred embodiment of an information recording medium (hereinafter, referred to as "recording medium") according to the present invention is described with reference to FIGS. 1 to 4.

Figure 1:
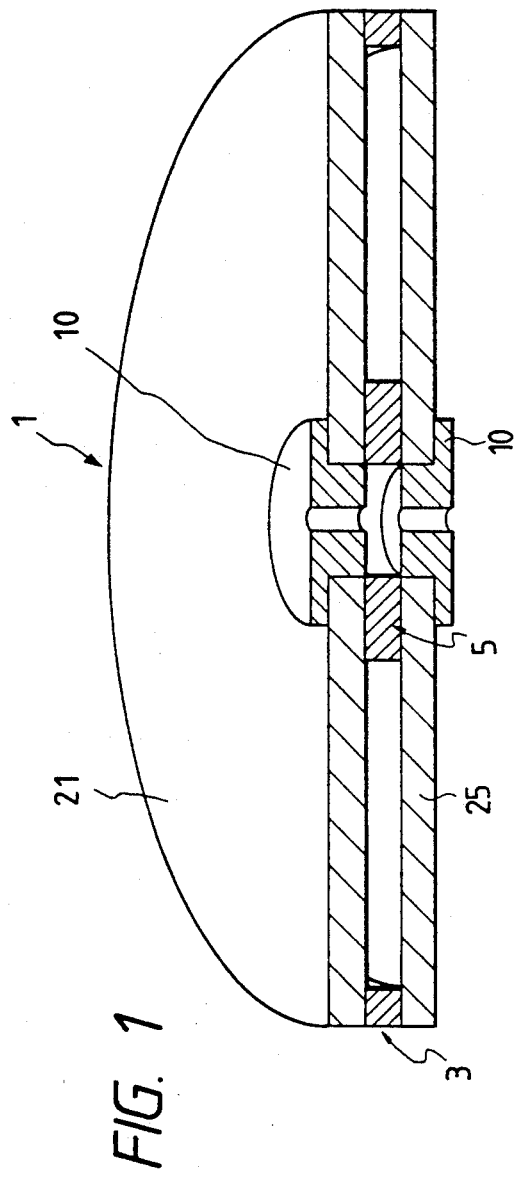
FIG. 1 is a schematic perspective view of an embodiment of the information recording medium according to the present invention, a portion of which has been cut.

Referring to FIG. 1, the recording medium 1 in the embodiment comprises a pair of substrates 21 and 25 in the form of flat plates disposed opposite to each other, spacers 3 and 5 in the form of a ring which are sandwiched between the opposite substrates 21 and 25, and are disposed respectively in a peripheral portion and an inner portion of the substrates. Hubs 10 for a magnetic clamp are disposed in the central portion of the substrates.

Figure 2:
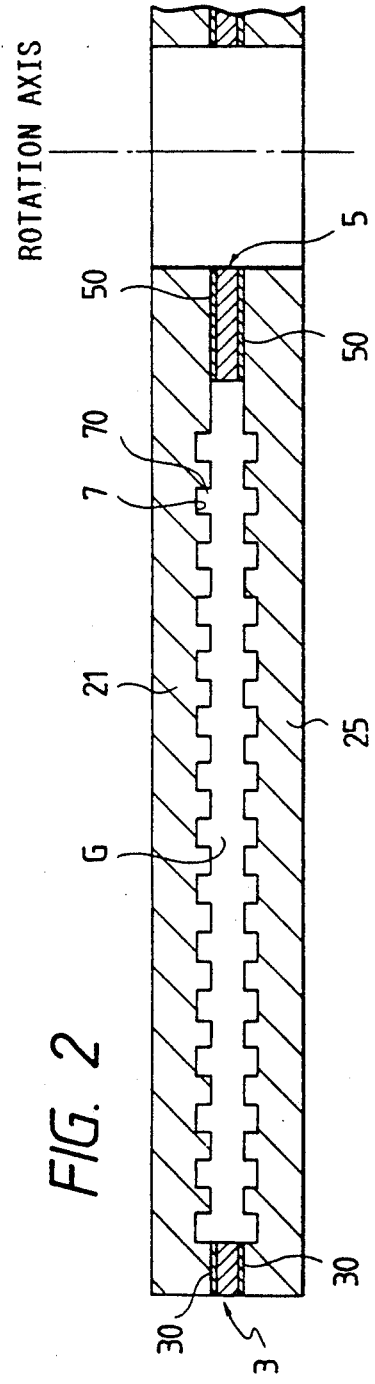
FIG. 2 is a partial schematic sectional view showing the structure of an embodiment of the information recording medium according to the present invention.

The substrates 21 and 25 generally comprises a plastic material and have surfaces provided with a groove 7 as shown in FIG. 2 which are disposed opposite to each other. On such a surface of the substrate, a recording film 70 is formed. The recording film 70 may preferably comprise an organic compound or material. Specific examples thereof may include those having either one of skeletons such as phenylmethane, methine, polymethine, pyrylium, indanthrene, quinone, dithiole, porphine, dioxazine, dithiazine, triquino-cyclopropane, fulgide, diarylethene, spiropyran and naphthoxazine. Various known inorganic compounds capable of optical recording can also be used as the recording film. The above-mentioned recording film may also be disposed either side of the opposite substrates.

The substrates 20 and 25 having the recording film 70 are fixed to each other by the medium of the spacers 3 and 5 disposed in the peripheral portion and inner portion of the substrate so as to provide a predetermined gap or clearance.

Figure 3:
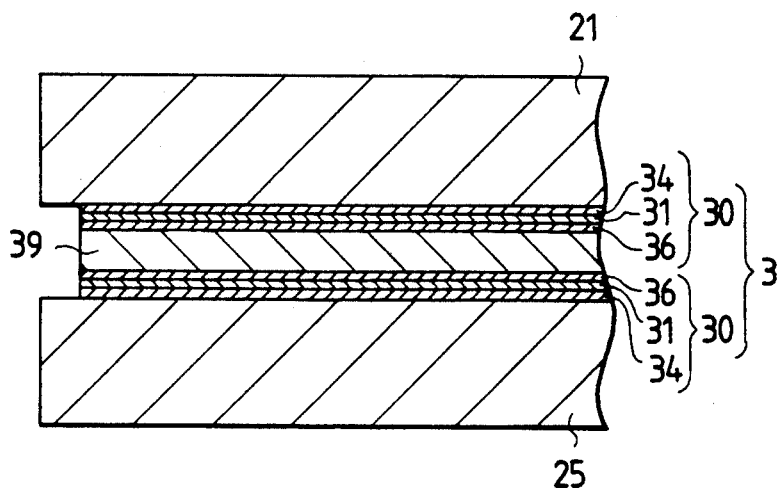
FIG. 3 is an enlarged schematic sectional view showing a peripheral portion of an embodiment of the information recording medium according to the present invention.
Figure 4:
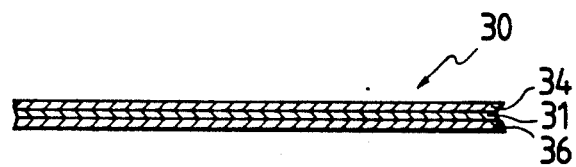
FIG. 4 is a schematic sectional view of a bonding member.

Referring to FIG. 3, the spacer 3 comprises a spacer main body 39 in the form of a ring comprising a plastic material such as polycarbonate resin, and a pair of bonding members 30 disposed on both surfaces of the spacer main body 39. Referring to FIG. 4, the bonding member 30 comprises a substrate 31 functioning as a supporting member and comprising, e.g., polyethylene terephthalate resin film, and a pair of layers 34 and 36 of a silicone type adhesive as a bond disposed on both surfaces of the substrate 31. The silicone type adhesive 34 and 36 contain platinum as a catalyst. When the silicone type adhesive, which has been produced on the basis of crosslinking and polymerization using such a platinum type catalyst, is used, deterioration in the recording film such as is caused by the conventional bond for a spacer produced by using a catalyst such as benzoyl peroxide.

The silicone type adhesive to be used in the present invention may preferably comprise an organopolysiloxane, an organohydrogenpolysiloxane, and a platinum type catalyst. The organopolysiloxane comprises a copolymer resin, and an organopolysiloxane comprising an $R'_2SiO$ unit which has partially been condensed to the copolymer resin. In the $R'_2SiO$ unit, $R'$ denotes a hydroxyl, an alkoxy, or, a substituted or unsubstituted univalent hydrocarbon group containing 0.005 to 3 mol % of vinyl group based on the total organic groups. The copolymer resin comprises an $SiO_2$ unit and an $R_3SiO_{0.5}$ unit wherein R denotes a substituted or unsubstituted univalent hydrocarbon group. The organohydrogenpolysiloxane comprises an $R''_2SiO$ unit wherein $R''$ denotes a hydrogen atom or a substituted or unsubstituted univalent hydrocarbon group. The $R''_2SiO$ unit comprises 0.02 to 10 mol % of Si—H group (based on the total organic groups) and the remainder predominantly comprising a methyl group. The organohydrogenpolysiloxane content in the adhesive may preferably be 1 to 6 wt. % based on the mixture comprising the above-mentioned copolymer resin and organopolysiloxane.

More specifically, the organopolysiloxane composition as an adhesive to be used in the present invention may be produced by mixing the above-mentioned copolymer resin comprising the $SiO_2$ unit and $R_3SiO_{0.5}$ unit, and the organopolysiloxane comprising the $R'_2SiO$ unit and subjecting the resultant mixture to partial condensation reaction. At this time, it is preferred to mix 60 to 40 wt. parts (more preferably 55 to 45 wt. parts, particularly preferably 50 wt. parts) of the copolymer resin with 40 to 60 wt. parts (more preferably 45 to 55 wt. parts, particularly preferably 50 wt. parts) of the organopolysiloxane.

In the above-mentioned copolymer resin, the mol ratio between the $SiO_2$ unit and the $R_3SiO_{0.5}$ unit may preferably be 1:0.5 to 1:1, more preferably 1:0.6 to 1:0.8, particularly preferably 1:0.7. When the mol ratio exceeds the above-mentioned range, i.e., the $SiO_2$ unit content becomes too high, the resultant copolymer becomes less compatible with the organopolysiloxane comprising R'$_2$SiO unit, whereby it becomes difficult to conduct the partial condensation. On the other hand, the SiO$_2$ unit content becomes too low, there can be posed a problem such that the cohesion property of the adhesive is deteriorated. The group R' of the above-mentioned copolymer resin denotes a hydroxyl group, an alkoxyl group, or a substituted or unsubstituted univalent hydrocarbon group. Specific examples of the substituted or unsubstituted univalent hydrocarbon group may include: alkyl groups such as methyl, ethyl and propyl; alkenyl groups such as vinyl and allyl; aryl groups such as phenyl; etc.

The vinyl group content in the organopolysiloxane comprising the R'$_2$SiO unit may preferably be 0.005 to 3 mol %, more preferably 0.01 to 2 mol %, particularly preferably 0.05 to 1 mol %, based on the content of the total organic groups bonded to the silicon atom of the organopolysiloxane. When the vinyl group content is below 0.005 mol %, the crosslinking degree is decreased to deteriorate the cohesion property. When the vinyl group content is above 3 mol %, the crosslinking degree is increased to deteriorate the adhesion property.

In a case where the wt. part ratio between the above-mentioned copolymer resin and organopolysiloxane comprising the R'$_2$SiO unit is outside the above-mentioned range, even when the wt. part ratio is below or above the range, there may be posed a problem such that the adhesion property is deteriorated.

On the other hand, the organohydrogenpolysiloxane comprising the R''$_2$SiO unit to be added to the above-mentioned organopolysiloxane based on the partial condensation is a component to be crosslinked with the above-mentioned condensation product. The R'' group used herein denotes a hydrogen atom or a univalent hydrocarbon group. The Si—H group content in the R''$_2$SiO unit may preferably be 0.02 to 10 mol %, more preferably 0.1 to 5 mol %, particularly preferably 0.6 to 3 mol % based on the total organic groups contained in the R''SiO unit. The remainder of the total organic groups predominantly comprise methyl groups. When the Si—H group content is outside the above range, the crosslinking density becomes too large or too small, thereby to pose a problem such that the resultant cohesion property or adhesion property is deteriorated. Such an organohydrogen polysiloxane may preferably be added to the mixture of the copolymer resin and the organopolysiloxane in an amount of 1 to 6 wt. %, more preferably 1 to 4 wt. %, particularly preferably 2 wt. %, When the addition amount of the organohydrogenpolysiloxane is below 1 wt. %, there is posed a problem such that the resultant crosslinking density is decreased to deteriorate the cohesion property. When the addition amount exceeds 6 wt. %, there is posed a problem such that the resultant cohesion property is enhanced to decrease the adhesion property.

Specific examples of such an organohydrogenpolysiloxane comprising the R''$_2$SiO unit may include those represented by the following formula.

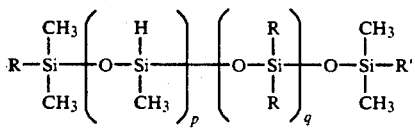

In the above formula, R denotes a substituted or unsubstituted univalent hydrocarbon group as described hereinabove, R' denotes a hydrogen atom or univalent hydrocarbon group, p=0 to 3000, q=0 to 3000. The compound represented by the above formula contains at least two hydrogen atoms bonded to the silicon atom in one molecule thereof.

The crosslinking catalyst comprises platinum or a platinum compound as a component thereof. The platinum or platinum compound may be a known one which has been used as a catalyst for addition reaction between an organopolysiloxane containing a vinyl group, and an organohydrogenpolysiloxane. Specific examples thereof may include: chloroplatinic acid, alcohol-modified chloroplatinic acid, a complex of chloroplatinic acid and an olefin, and a carrier such as platinum, alumina, and silica, and solid platinum carried thereon.

The spacer 5 disposed in the inner portion of the substrate may have the same structure as that of the spacer 3 as described hereinabove.

Figure 5:
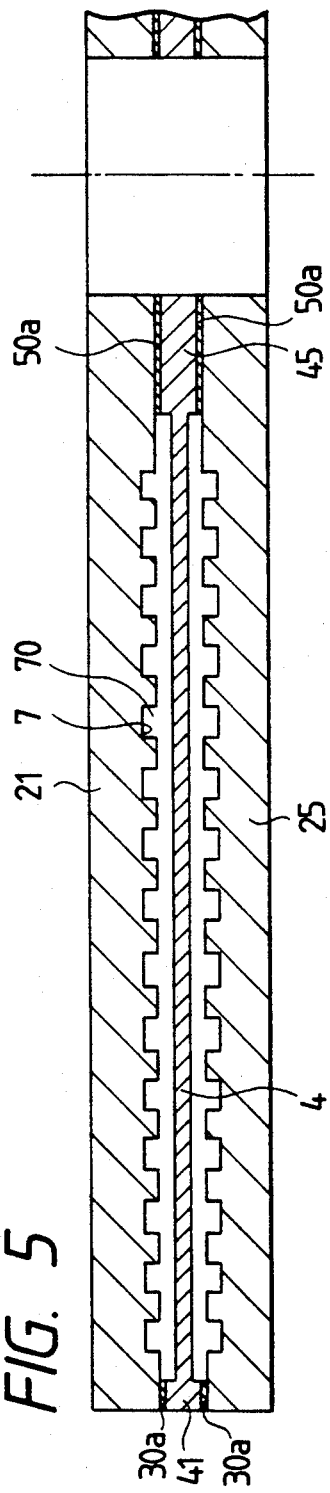
FIGS. 5 and 6 are partial schematic sectional views each showing another embodiment of the information recording medium according to the present invention.
Figure 6:
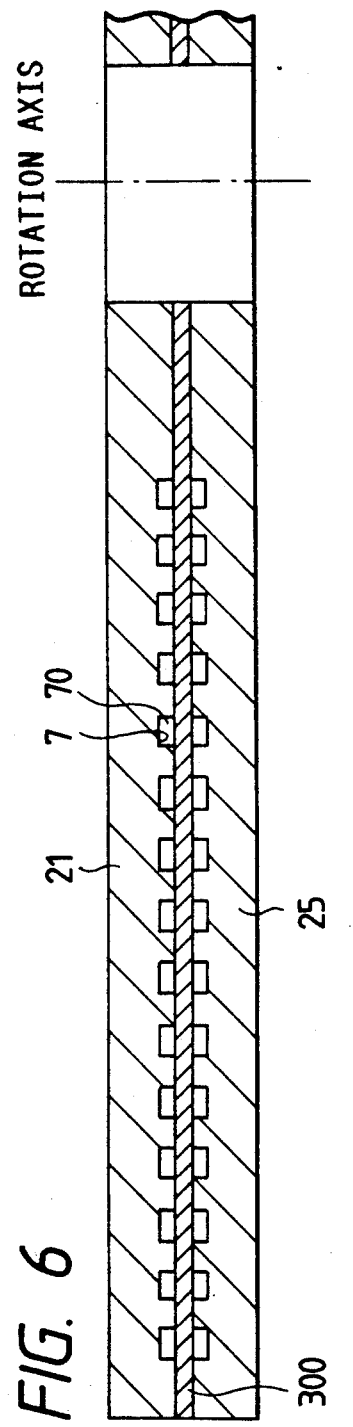

FIGS. 5 and 6 respectively show another embodiment of the recording medium as described hereinabove.

FIG. 5 shows an embodiment using a flat plate spacer 4 having projections 41 and 45 corresponding to the peripheral and inner portions of the substrates 21 and 25. On the projections 41 and 45, bonding members 30a, 30a, 50a and 50b in the form of a ring are disposed. These bonding members may have the same structures as that of the bonding member 30 as described hereinabove.

FIG. 6 shows an embodiment wherein the substrates 21 and 25 are bonded to each other by the medium of a bonding layer 300. In such an embodiment, the bonding layer 300 may have a basic structure which is the same as that of the bonding member 30 as described hereinabove.

When the recording medium according to the present invention is used, recording light in the form of pulses may generally be supplied thereto, while the recording medium is rotated. At this time, a portion of the recording film is fused to be removed, whereby a pit may be formed.

The thus formed pit may be detected by measuring a difference in the reflection light based on readout light, while the recording medium is rotated.

Below, the present invention will be described in more detail with reference to specific Examples.

EXAMPLE 1

50 wt. parts of a methylpolysiloxane resin comprising 0.7 mol part of (CH$_3$)$_3$SiO$_{0.5}$ unit and 1.0 mol part of SiO$_2$ unit and 50 wt. parts of a diorganopolysiloxane in the form of a raw rubber comprising 99.8 mol part of (CH$_3$)$_2$SiO unit and 0.2 mol part of (CH$_2$=CH)(CH$_3$)SiO unit were mixed with each other together with toluene, and the resultant mixture was subjected to a partial condensation reaction for about six hours at 100° to 130° C., whereby 60% toluene solution of a vinyl group-containing organopolysiloxane was formed.

Then, 2 wt. % of a methylhydrogenpolysiloxane having an average polymerization degree of 200 wherein both ends of the molecular chain had been blocked with trimethylsilyl groups and 0.05 atom/100 g (Si—H:1.7 mol %) of hydrogen atom directly bonded to the silicon atom was contained, was added to the above-mentioned toluene solution, chloroplatinic acid was added to the thus prepared mixture so as to provide a platinum content of 15 ppm, and the resultant mixture was diluted with toluene so as to provide a non-volatile content of 30 wt. %, whereby a coating liquid was prepared.

The coating liquid was applied onto both surfaces of a 25 μm-thick polyester film and the resultant coating was dried and hardened at 130° C. for 10 mins., thereby to prepare an adhesive tape having a 30 μm-thick adhesive layer on each of the surfaces.

An information recording medium as shown in FIG. 2 (i.e., Sample according to the present invention) was prepared by using the above-mentioned adhesive tape as a bonding member 30.

COMPARATIVE EXAMPLE 1

1.2 wt. parts of benzoyl peroxide and 100 wt. parts of toluene were added to 100 wt. parts of an silicone type adhesive agent (tradename: KR101-10, mfd. by Shinetsu Kagaku K.K.) thereby to prepare a coating liquid.

The coating liquid was applied onto both surfaces of a 25 μm-thick polyester film and the resultant coating was dried and hardened at 130° C. for 10 mins., thereby to prepare an adhesive tape having a 30 μm-thick adhesive layer on each of the surfaces.

An information recording medium as shown in FIG. 2 (i.e., Comparative Sample 1) was prepared by using the above-mentioned adhesive tape as a bonding member.

COMPARATIVE EXAMPLE 2

1 wt. parts of an aminosilane (tradename: KBM-603, mfd. by Shinetsu Kagaku K.K.) and 100 wt. parts of toluene were added to 100 wt. parts of a silicone type adhesive agent (tradename: SH-4280, mfd. by Toray Silicone K.K.) thereby to prepare a coating liquid.

The coating liquid was applied onto both surfaces of a 25 μm-thick polyester film and the resultant coating was dried and hardened at 480° C. for 5 mins., thereby to prepare an adhesive tape having a 30 μm-thick adhesive layer on each of the surfaces.

An information recording medium as shown in FIG. 2 (i.e., Comparative Sample 3) was prepared by using the above-mentioned adhesive tape as a bonding member.

COMPARATIVE EXAMPLE 3

A mixture comprising 100 wt.parts of butyl acrylate (73.4 equivalent %), 20 wt.parts of methyl methacrylate (18.8 equivalent %), 6 wt.parts of acrylic acid (7.8 equivalent %), 350 wt.parts of benzole, and 0.25 wt.parts of benzoyl peroxide was subjected to polymerization at 60° C. under heating and stirring in a nitrogen stream for a polymerization time of 8 hours, thereby to obtain a polymerization product having a viscosity of about 5000 cp (polymerization yield=90 to 93%). The resultant product contained the acrylic acid in an amount of about 10 equivalent %.

0.5 equivalent (based on the acrylic acid contained in the polymerization product) of Desmodur TH (partially polymerized product comprising 4 wt.parts of tolylene diisocyanate, 1 wt.parts of hexanediol and 1 wt.parts of trimethylolpropane) was added to the polymerization product and mixed therewith uniformly thereby to prepare a coating liquid.

The coating liquid was applied onto both surfaces of a μm-thick polyester film and the resultant coating was dried and crosslinked at 130° C. for 10 min., thereby to prepare an adhesive tape having a 30 μm-thick adhesive layer on each of the surfaces.

An information recording medium as shown in FIG. 2 (i.e., Comparative Sample 3) was prepared by using the above-mentioned adhesive tape as a bonding member.

In each of the above-mentioned four species of sample (i.e., Sample according to the present invention, and Comparative Samples 1 to 3), a thin film of cyanine type dye as an organic dye film as used as the recording film.

Figure 7A:
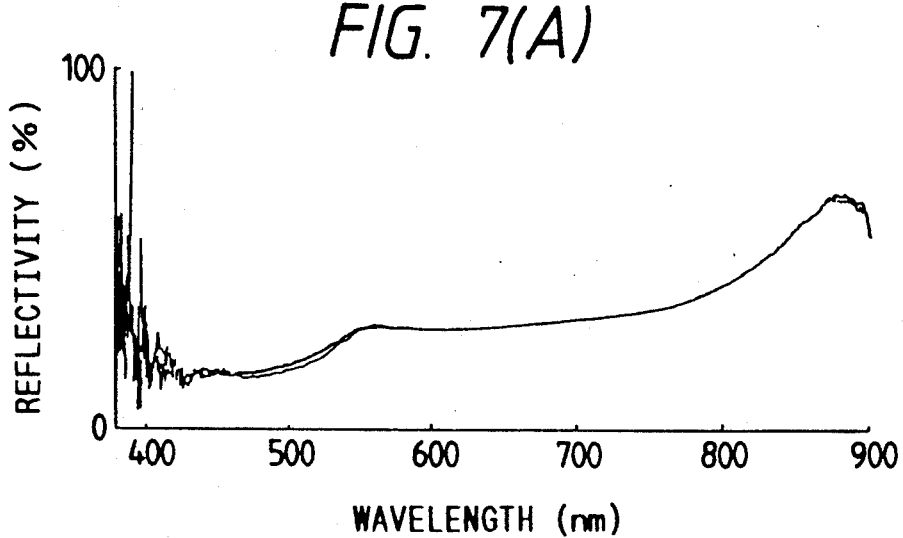
FIGS. 7A to 7C are graphs each showing a change in reflectivity which has been measured by use of transmission light passing through a substrate at a predetermined wavelength.
Figure 7B:
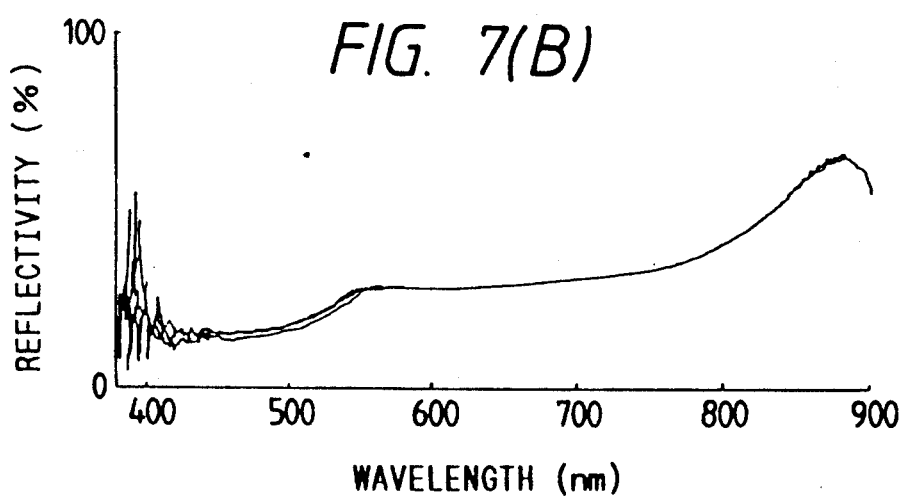
Figure 7C:
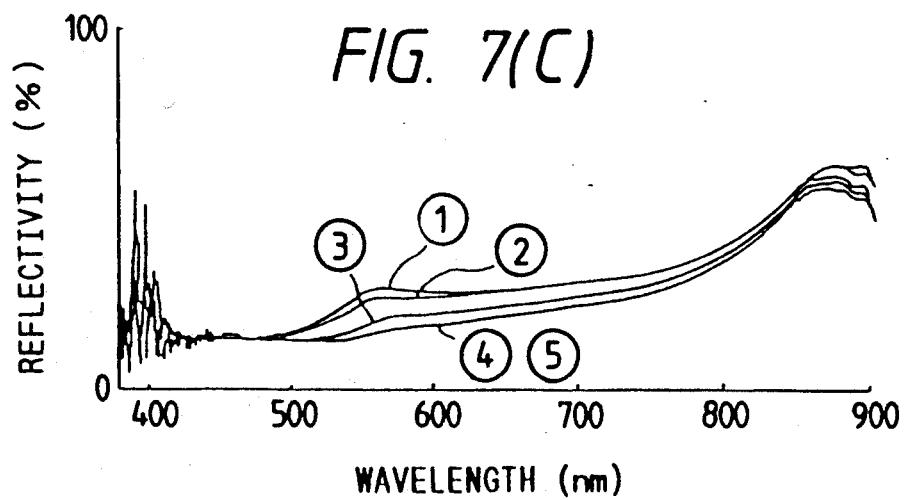

With respect to each of these Samples, changes in reflectivity corresponding to respective wavelengths were measured by using transmission light passing through the substrate. The results are shown in FIGS. 7A to 7C. FIG. 7A shows dependence of initial reflection characteristic of each of the Sample according to the present invention and Comparative Samples 1 to 3 on wavelength. In the initial stage, respective tendencies in the reflectivity are substantially the same as compared with each other. Accordingly, such a tendency is represented by FIG. 7A alone.

Figure 8:
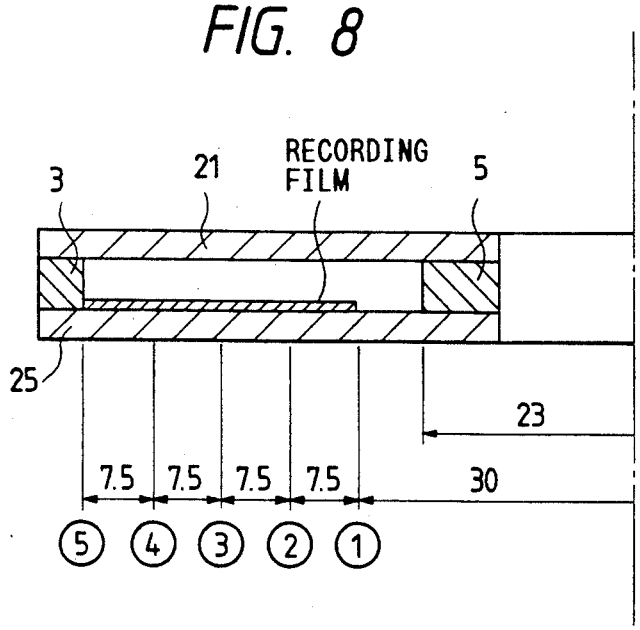
FIG. 8 is a partial schematic sectional view of a disk for illustrating a measurement position.

Further, the above-mentioned respective Samples were left standing in an absolute dry environment at 50° C. for 200 hours and then the changes in reflectivity were investigated. The results are shown in FIGS. 7B and 7C, wherein FIG. 7B corresponds to Sample according to the present invention, and FIG. 7C corresponds to Comparative Samples 1 to 3. Since these Comparative Samples showed substantially the same behavior such behavior is represented by FIG. 7C alone. In the above-mentioned measurement, measurement positions were points 1 to 5 as shown in the schematic view of FIG. 8 disposed in a radius direction. At this time, the outer spacer 3 contacted the recording film.

The Sample according to the present invention showed no change as shown in FIG. 7B, but Comparative Samples showed a considerable decrease in the reflectivity depending on the measurement portion of the recording film as shown in FIG. 7C. Such a decrease in the reflectivity indicates the promotion of molecular degradation in the recording film corresponding to the degree of the decrease. As a result, it was found that the recording film of the Sample according to the present invention was not affected at all.

Figure 9:
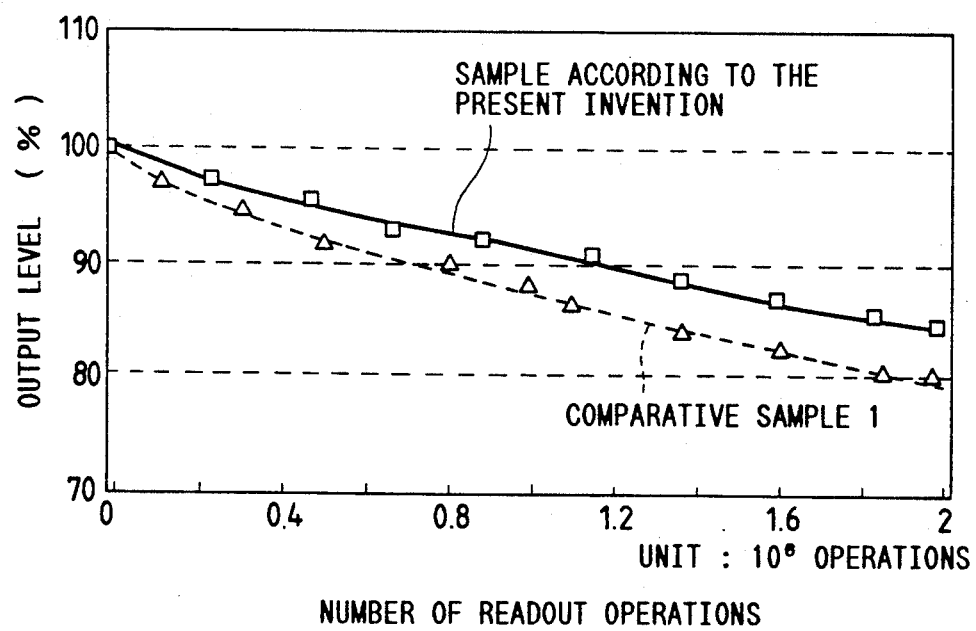
FIG. 9 is a graph showing some results of durability tests using repetitive readout.

FIG. 9 shows data on repetitive readout durability. It is ideal that the value in the ordinate is retained at 100, but in general, the value is gradually decreased in practice. When the Sample according to the present invention is compared with Comparative Sample 1, it is found that the value corresponding to the former was superior to that corresponding to the latter. For example, the value in Comparative Sample 1 was decreased to 90% of the initial value at the time of $70 \times 10^4$ readout operations, but the value in Sample according to the present invention was decreased to 90% of the initial value at the time of $118 \times 10^4$ readout operations. Accordingly, the Sample was superior to Comparative Sample 1.

According to our investigation it was suggested that the conventional adhesive used in Comparative Sample 1 produced a reactive gas affecting the recording film, but the Sample according to the present invention did not cause such a phenomenon. It is considered that such results clearly show the effect of the present invention.

As described above, according to the present invention, there is provided an information recording medium having a pair of disk substrates at least one of which has an optical recording layer (film) on one surface thereof. The substrates are bonded to each other by using a silicone type adhesive, directly or by the medium of a spacer, so that the recording layer (film) may be disposed inside of the substrates. In the present invention, platinum is incorporated in the above-mentioned silicone type adhesive by using a platinum type crosslinking catalyst, without using the conventional benzoyl peroxide type crosslinking catalyst. As a result, the present invention may provide an information recording medium having excellent mechanical strength, reliability and durability.

What is claimed is:

1. An information recording medium comprising a pair of substrates each in the form of a disk, at least one of said substrates has an optical recording layer on one surface thereof; said substrates being bonded to each other, directly or by virtue of a spacer, by use of a silicone adhesive so that said recording layer is disposed between said substrates;

wherein said silicone adhesive contains platinum.

2. An information recording medium according to claim 1, wherein said silicone adhesive comprises an organopolysiloxane, an organohydrogenpolysiloxane, and a 60 to 40 wt.parts of a copolymer resin, and 40 to 60 wt.parts of an organopolysiloxane comprising an $R'_2SiO$ unit which has been mixed with or partially condensed to the copolymer resin, wherein $R'$ denotes a hydroxyl, an alkoxy or, a substituted or unsubstituted univalent hydrocarbon group containing 0.005 to 3 mol% of vinyl group based on the total organic groups; said copolymer resin comprising an $SiO_2$ unit and an $R_3SiO_{0.5}$ units in a mol ratio of (1:0.5) to (1:1), wherein R denotes a substituted or unsubstituted univalent hydrocarbon group; said organohydrogenpolysiloxane comprising an $R''_2SiO$ unit wherein $R''$ denotes a hydrogen atom or, a substituted or unsubstituted univalent hydrocarbon group; said $R''_2SiO$ unit comprises 0.02 to 10 mol% of Si—H group (based on the total organic groups) and the remainder predominantly comprising a methyl group; said organohydrogenpolysiloxane being contained in the adhesive in an amount of 1 to 6 wt.% based on the mixture comprising the copolymer resin and organopolysiloxane.

3. An information recording medium according to claim 1, wherein said recording layer comprises a thin film of an organic material wherein recording is effected by using pit formation.

4. An information recording medium according to claim 3, wherein said recording layer comprises a film of an organic dye.

5. An information recording medium according to claim 1, wherein said silicone adhesive comprises an organopolysiloxane, an organohydrogenpolysiloxane, and a platinum type catalyst; said organopolysiloxane comprising 55 to 45 wt.parts of a copolymer resin, and 45 to 55 wt.parts of an organopolysiloxane comprising an $R'_2SiO$ unit which has been mixed with or partially condensed to the copolymer resin, wherein $R'$ denotes a hydroxyl, an alkoxy, or, a substituted or unsubstituted univalent hydrocarbon group containing 0.01 to 2 mol% of vinyl group based on the total organic groups; said copolymer resin comprising an $SiO_2$ unit and an $R_3SiO_{0.5}$ units in a mol ratio of (1:0.6) to (1:0.8), wherein R denotes a substituted or unsubstituted univalent hydrocarbon group; said organohydrogenpolysiloxane comprising an $R''_2SiO$ unit wherein $R''$ denotes a hydrogen atom or, a substituted or unsubstituted univalent hydrocarbon group; said $R''_2SiO$ unit comprises 0.1 to 5 mol% of Si—H group (based on the total organic groups) and the remainder predominantly comprising a methyl group; said organohydrogen-polysiloxane being contained in the adhesive in an amount of 1 to 6 wt.% based on the mixture comprising the copolymer resin and organopolysiloxane.

6. An information recording medium according to claim 1, wherein the silicone adhesive further contains an organopolysiloxane having a vinyl group and an organohydrogenpolysiloxane.

* * * * *